Patented Nov. 12, 1940

2,220,976

UNITED STATES PATENT OFFICE 2,220,976

SHORTENING

Herbert Schou, Juelsminde, Denmark

No Drawing. Application January 8, 1938, Serial No. 184,027. In Great Britain January 21, 1937

8 Claims. (Cl. 99—123)

This invention relates to improved shortenings of the dispersion type for bakery purposes.

Different kinds of shortenings for bakery purposes are known. They generally consist of edible oils, fats or oil fat mixtures or of their dispersions with water or aqueous liquids. Good shortening results have been obtained with stable dispersions of water or aqueous liquids, such as milk or a like watery solution of sugar or albumen as the disperse phase, in oils, fats or mixtures thereof as the continuous phase, these dispersions being prepared with dispersing agents and stabilisers, capable of forming water-in-oil dispersions, which are thermo-stable, i. e. stable even when heating them to temperatures of between about 40 and about 95° C. Although these stable water-in-oil dispersion-shortenings make possible a considerable economy of oils or fats in the art of baking, they are not always completely satisfactory in mechanical respect. Their stability against the influence of pressure is namely only limited. This is especially the case, when their content in water or aqueous liquid is high, for example amounts to about 66%, which is desired in order to save fat or oil. As pressure cannot be avoided, when a shortening is mixed with and distributed in the dough by kneading, a part of the water or aqueous disperse phase of these known water-in-oil dispersion-shortenings may be pressed out, which may lead to a destruction or alteration of the structure of the dispersion-shortening employed.

The main object of the present invention is to provide for a shortening of the dispersion type, which is stable against the influence of pressure.

A further object of the invention is to provide for a shortening of the water-in-oil dispersion type, which is resistant against the influence of freezing temperatures during its transport and storage.

Still a further object of the invention is to provide for a shortening of the water-in-oil dispersion type, which does not leak or leaks less than the known products, when the shortening is stored for a long time.

Still another object of the invention is to provide for a shortening of the plastic water-in-oil dispersion type, which is plastic immediately after the dispersing operation employed in its manufacture without a plasticizing after-treatment following the dispersing operation.

With these and other objects in view the shortening according to the invention consists of a dispersion containing liquid or plastic edible fatty acid glycerides as continuous phase, edible saccharide or aqueous liquid and edible saccharide as disperse phase, and a small but effective amount of a dispersing and stabilising agent belonging to the group of dispersing and stabilising agents for the manufacture of thermo-stable water-in-oil dispersions.

When using aqueous liquid and edible saccharide, such as aqueous solutions or suspensions of saccharides as the disperse phase of the shortening dispersion, the main object of the invention, i. e. high resistance to pressure, is only obtained, when the aqueous saccharide solution or suspension contains at least one part of saccharide to nine parts of aqueous liquid. This increased resistance to pressure, compared with that of the known water-in-oil dispersion shortenings, is especially noticeable with shortenings having a large disperse phase of at least 20%, preferably 40–70%.

The following example serves to illustrate how the shortenings of this invention are produced and employed.

1.5 to 3 parts of a dispersing and stabilising agent capable of forming thermo-stable water-in-oil dispersions are dissolved in about 40 parts of a melted mixture of hydrogenated cotton seed oil and coconut oil. Suitable agents are emulsion oils, such as are obtained by polymerisation of oils and/or fats containing glycerides of unsaturated fatty acids, oxidation of the same oils and/or fats, polymerisation and oxidation or oxidation and polymerisation or simultaneous polymerisation and oxidation of the same oils and/or fats, or by dissolving in two parts of oil one part of the gelatinous product made by polymerisation and/or oxidation of oils and/or fats containing glycerides of unsaturated fatty acids. Other suitable dispersing agents are condensation products of higher fatty acids and polysaccharides, such as starch. Generally speaking all dispersing agents and stabilisers for the manufacture of thermo-stable water-in-oil emulsions are suitable, very good results being obtained with the aforementioned agents and similar agents, having a high molecular weight and consisting of or containing or prepared from higher fatty acids or their compounds.

In the melted oil mixture, containing the dispersing agent, about 60 parts of a 20% water containing glucose are dispersed, by adding the glucose in small portions to the oil mixture in a fast running beater or stirrer. The dispersion of the glucose may also be carried out by introducing it through an atomiser into the oil mixture or by repeatedly passing a mixture of the oil mixture and the glucose through a fast running emulsifying pump. Also in these cases it is advisable to add the glucose in portions, a fresh portion being added when the previously added portion is dispersed. The dispersing operation is stopped, when the dispersion is stable, that is to say no separation of the phases takes place on standing. The dispersion is cooled and the shortening thus obtained is plastic and resistant to the influence of pressure, as exerted by the usual kneading process in the preparation of dough. The shortening is also resistant to the influence of freezing temperatures and does not leak, even after long storage and transport at fluctuating temperatures.

30 parts of the above described shortening containing 40% of oil-fat are evenly distributed by kneading in 2775 parts of a dough, prepared from 1700 parts of wheat flour, 1000 parts of milk, 60 parts of yeast and 15 parts of salt. The bread made with this dough is of a high quality.

In the example the hydrogenated cotton seed oil and the coconut oil may be replaced by other edible oils and fats such as arachis oil, soya bean oil, ground nut oil, tallow, hydrogenated whale oil and the like. Also the amount of dispersing agent employed may vary according to its dispersing and stabilising powers. The water content of the glucose may also vary and the glucose may be wholly or partially replaced by beet-sugar, cane sugar, laevulose, syrup, molasses, maltose, starch, flour and the like saccharides or edible saccharide derivates, possessing saccharide character. Thus for example the glucose containing 20% of water in the shortening described above may be replaced by a suspension of 80% starch or flour in water. Sodium chloride and other salts, such as phosphates, which have to be added to the dough may also be present in the shortening.

I claim:

1. A pressure and thermo-stable shortening dispersion for preparing baking products containing not more than 80% of edible fatty acid glyceride as the continuous phase, aqueous liquid and at least 2% of a solid edible saccharide in the dispersed phase, and a small but effective amount of a dispersing and stabilizing agent belonging to the group of dispersing and stabilizing agents for the manufacture of thermo-stable water-in-oil dispersions, said dispersion being plastic immediately after dispersing, being stable at temperatures up to about 95° C., being stable under kneading pressure, being resistant to freezing temperatures, and being stable in storage for a long period of time.

2. A shortening dispersion for preparing baking products containing not more than 80% of edible fatty acid glyceride as continuous phase, aqueous liquid and solid edible saccharide at the ratio of at least one part of saccharide to nine parts of aqueous liquid as disperse phase, and a small but effective amount of a dispersing and stabilizing agent belonging to the group of dispersing and stabilising agents for the manufacture of thermo-stable water-in-oil dispersions.

3. A shortening dispersion for preparing baking products containing not more than 80% of edible fatty acid glyceride as continuous phase, at least 20% of aqueous solution of at least one part of solid edible saccharide in nine parts of aqueous liquid as disperse phase, and a small but effective amount of a dispersing and stabilising agent belonging to the group of dispersing and stabilising agents for the manufacture of thermo-stable water-in-oil dispersions.

4. A shortening dispersion for preparing baking products containing not more than 80% of edible fatty acid glyceride as continuous phase, at least 20% of aqueous solution of at least one part of solid glucose in nine parts of aqueous liquid as disperse phase, and a small but effective amount of a dispersing and stabilising agent belonging to the group of dispersing and stabilising agents for the manufacture of thermo-stable water-in-oil dispersions.

5. A shortening dispersion for preparing baking products containing not more than 80% of edible fatty acid glyceride as continuous phase, at least 20% of an about 20% water containing glucose as disperse phase, and a small but effective amount of a dispersing and stabilising agent belonging to the group of dispersing and stabilising agents for the manufacture of thermo-stable water-in-oil dispersions.

6. A shortening dispersion for preparing baking products containing not more than 80% of plastic edible fatty acid glyceride as continuous phase, aqueous liquid and solid edible saccharide at the ratio of at least one part of saccharide to nine parts of aqueous liquid as disperse phase, and a small but effective amount of a dispersing and stabilising agent belonging to the group of dispersing and stabilising agents for the manufacture of thermo-stable water-in-oil dispersions.

7. A shortening dispersion for preparing baking products containing not more than 80% of plastic edible fatty acid glyceride as continuous phase, aqueous solution of at least one part of solid edible saccharide in nine parts of aqueous liquid as disperse phase, and a small but effective amount of a dispersing and stabilising agent belonging to the group of dispersing and stabilising agents for the manufacture of thermo-stable water-in-oil dispersions.

8. A shortening dispersion for preparing baking products containing not more than 80% of plastic edible fatty acid glyceride as continuous phase, at least 20% of aqueous solution of at least one part of solid edible saccharide in nine parts of aqueous liquid as disperse phase, and a small but effective amount of a dispersing and stabilising agent belonging to the group of dispersing and stabilising agents for the manufacture of thermo-stable water-in-oil dispersions.

HERBERT SCHOU.